US008949827B2

(12) United States Patent
Becker et al.

(10) Patent No.: US 8,949,827 B2
(45) Date of Patent: Feb. 3, 2015

(54) TRACKING A VIRTUAL MACHINE

(75) Inventors: Daniel Lee Becker, Frederick, MD (US); Andrew W. Brandt, Frederick, MD (US); Vipul Sharma, Germantown, MD (US); Mark James Yourcheck, Hanover, MD (US); Stephen C. Carr, Frederick, MD (US); Tim Campbell, Linthicum, MD (US)

(73) Assignee: Red Hat, Inc., Raleigh, NC (US)

( * ) Notice: Subject to any disclaimer, the term of this patent is extended or adjusted under 35 U.S.C. 154(b) by 1582 days.

(21) Appl. No.: 12/013,314

(22) Filed: Jan. 11, 2008

(65) Prior Publication Data
US 2009/0182928 A1 Jul. 16, 2009

Related U.S. Application Data

(63) Continuation-in-part of application No. 11/767,173, filed on Jun. 22, 2007, now Pat. No. 8,191,141.

(51) Int. Cl.
*G06F 9/455* (2006.01)
*G06F 9/54* (2006.01)

(52) U.S. Cl.
CPC .. *G06F 9/45558* (2013.01); *G06F 2009/45591* (2013.01)
USPC ............................................. 718/1; 719/313

(58) Field of Classification Search
CPC .................. G06F 9/45558; G06F 2009/45591
USPC ................ 718/1, 100, 101; 719/313
See application file for complete search history.

(56) References Cited

U.S. PATENT DOCUMENTS

| 7,181,769 B1 | 2/2007 | Keanini et al. | |
| 7,356,679 B1 * | 4/2008 | Le et al. | 713/1 |
| 7,600,259 B2 | 10/2009 | Qi | |
| 7,698,545 B1 * | 4/2010 | Campbell et al. | 713/1 |

(Continued)

FOREIGN PATENT DOCUMENTS

| WO | WO 03055180 A1 * | 7/2003 |
| WO | WO 2005-050414 | 6/2005 |
| WO | WO 2005-101782 | 10/2005 |

OTHER PUBLICATIONS

Janiquec "Virtual Server 2005 R2 Common Iussues and Tps—Duplicate MAC Addresses", Nov. 29, 2007, pp. 1-2, Online link: http://msvirt.wordpress.com/2007/11/29/virtual-server-2005-r2-common-issues-and-tips-duplicate-mac-addresses/.*

(Continued)

*Primary Examiner* — Emerson Puente
*Assistant Examiner* — Willy W Huaracha
(74) *Attorney, Agent, or Firm* — Lowenstein Sandler LLP

(57) ABSTRACT

A method and system provide tracking of a virtual machine by compiling information on the virtual machines in a network and sending the information to an administrative console. The administrative console can then determine the status of the virtual machines in the network. The administrative console can also establish a lineage of a virtual machine and the migration of a virtual machine from one host machine to another host machine. A virtual machine unique identifier assigned to each virtual machine by the system can be modified and used to track each virtual machine and associated host machine. A status can then be determined of the virtual machines, where the status can be a new virtual machine, a previously discovered virtual machine, a duplicated virtual machine, or a cloned virtual machine.

20 Claims, 12 Drawing Sheets

(56) References Cited

U.S. PATENT DOCUMENTS

| | | |
|---|---|---|
| 7,761,917 B1 | 7/2010 | Kumar |
| 7,877,781 B2 | 1/2011 | Lim |
| 7,886,294 B2 * | 2/2011 | Dostert et al. .................... 718/1 |
| 8,127,290 B2 | 2/2012 | Suit |
| 2003/0014626 A1 | 1/2003 | Poeluev et al. |
| 2003/0046586 A1 | 3/2003 | Bheemarasetti et al. |
| 2003/0084329 A1 | 5/2003 | Tarquini |
| 2003/0101245 A1 | 5/2003 | Srinivasan et al. |
| 2003/0120935 A1 | 6/2003 | Teal et al. |
| 2003/0145225 A1 | 7/2003 | Bruton et al. |
| 2003/0158983 A1 | 8/2003 | Dalakuras et al. |
| 2004/0122937 A1 | 6/2004 | Huang et al. |
| 2005/0010765 A1 | 1/2005 | Swander et al. |
| 2005/0102529 A1 | 5/2005 | Buddhikot et al. |
| 2005/0125503 A1 | 6/2005 | Iyengar et al. |
| 2005/0240558 A1 | 10/2005 | Gil et al. |
| 2005/0289648 A1 | 12/2005 | Grobman et al. |
| 2006/0037072 A1 | 2/2006 | Rao et al. |
| 2006/0041885 A1 * | 2/2006 | Broquere et al. ................ 718/1 |
| 2006/0136720 A1 | 6/2006 | Armstrong et al. |
| 2006/0156380 A1 | 7/2006 | Gladstone et al. |
| 2006/0230134 A1 | 10/2006 | Qian et al. |
| 2006/0271395 A1 | 11/2006 | Harris et al. |
| 2007/0011667 A1 | 1/2007 | Subbiah et al. |
| 2007/0043860 A1 | 2/2007 | Pabari |
| 2007/0058551 A1 | 3/2007 | Brusotti et al. |
| 2007/0073882 A1 * | 3/2007 | Brown et al. .................. 709/226 |
| 2007/0147271 A1 | 6/2007 | Nandy et al. |
| 2007/0169121 A1 * | 7/2007 | Hunt et al. ........................ 718/1 |
| 2007/0198656 A1 | 8/2007 | Mazzaferri et al. |
| 2007/0204153 A1 | 8/2007 | Tome et al. |
| 2007/0234412 A1 | 10/2007 | Smith et al. |
| 2007/0238524 A1 | 10/2007 | Harris et al. |
| 2007/0261112 A1 | 11/2007 | Todd et al. |
| 2008/0005124 A1 | 1/2008 | Jung et al. |
| 2008/0016570 A1 | 1/2008 | Capalik et al. |
| 2008/0047009 A1 | 2/2008 | Overcash et al. |
| 2008/0056487 A1 | 3/2008 | Akyol et al. |
| 2008/0089338 A1 * | 4/2008 | Campbell et al. ............. 370/392 |
| 2008/0134175 A1 * | 6/2008 | Fitzgerald et al. ................ 718/1 |
| 2008/0140795 A1 | 6/2008 | He et al. |
| 2008/0163210 A1 * | 7/2008 | Bowman et al. .................. 718/1 |
| 2008/0184225 A1 | 7/2008 | Fitzgerald et al. |
| 2008/0263658 A1 | 10/2008 | Michael et al. |
| 2008/0271025 A1 | 10/2008 | Gross et al. |
| 2008/0288962 A1 | 11/2008 | Greifendeder et al. |
| 2008/0320499 A1 | 12/2008 | Suit et al. |
| 2008/0320561 A1 | 12/2008 | Suit et al. |
| 2008/0320583 A1 | 12/2008 | Sharma et al. |
| 2008/0320592 A1 | 12/2008 | Suit et al. |
| 2009/0049453 A1 * | 2/2009 | Baran et al. ................... 719/313 |
| 2009/0064136 A1 * | 3/2009 | Dow et al. ......................... 718/1 |
| 2009/0182928 A1 | 7/2009 | Becker et al. |
| 2009/0183173 A1 | 7/2009 | Becker et al. |
| 2009/0210427 A1 | 8/2009 | Eidler et al. |
| 2009/0216816 A1 | 8/2009 | Basler et al. |
| 2009/0254993 A1 | 10/2009 | Leone |
| 2009/0307689 A1 * | 12/2009 | Sudhakar .......................... 718/1 |
| 2010/0011200 A1 | 1/2010 | Rosenan |
| 2010/0031258 A1 * | 2/2010 | Takano et al. .................... 718/1 |
| 2010/0077078 A1 | 3/2010 | Suit et al. |
| 2010/0205304 A1 * | 8/2010 | Chaturvedi et al. ........... 709/226 |
| 2010/0332432 A1 | 12/2010 | Hirsch |

OTHER PUBLICATIONS

Red Hat Office Action for U.S. Appl. No. 11/767,173, mailed Jul. 6, 2010.
Red Hat Office Action for U.S. Appl. No. 11/767,173, mailed Dec. 14, 2010.
Red Hat Notice of Allowance for U.S. Appl. No. 11/767,173, mailed Nov. 7, 2011.
Red Hat Office Action for U.S. Appl. No. 11/867,456, mailed Aug. 1, 2011.
Red Hat Office Action for U.S. Appl. No. 11/867,456, mailed Feb. 16, 2011.
Red Hat Office Action for U.S. Appl. No. 12/111,110, mailed Mar. 17, 2011.
Red Hat Office Action for U.S. Appl. No. 12/111,110, mailed Aug. 17, 2011.
Red Hat Office Action for U.S. Appl. No. 11/867,500, mailed Dec. 23, 2010.
Red Hat Notice of Allowance for U.S. Appl. No. 11/867,500, mailed Jun. 29, 2011.
Red Hat Notice of Allowance for U.S. Appl. No. 11/867,500, mailed Oct. 14, 2011.
Red Hat Office Action for U.S. Appl. No. 12/013,304, mailed Apr. 13, 2011.
Red Hat Office Action for U.S. Appl. No. 12/013,304, mailed Oct. 4, 2011.
Hardwood, Aaron, Parallel Virtual Machine, Oct. 22, 2003, pp. 1-5.
Red Hat Office Action for U.S. Appl. No. 11/867,456, mailed Jan. 19, 2012.
Red Hat Office Action for U.S. Appl. No. 12/111,110, mailed Jan. 18, 2012.
Red Hat Office Action for U.S. Appl. No. 12/626,872, mailed Jan. 13, 2012.

* cited by examiner

TRACKING A VIRTUAL MACHINE

CROSS REFERENCES TO RELATED APPLICATIONS

This patent application is a continuation-in-part of and claims the benefit of U.S. patent application Ser. No. 11/767,173, filed on Jun. 22, 2007 now U.S. Pat. No. 8,191,141.

BACKGROUND

1. Field

The invention relates generally to communications between entities within a virtual communications network and more specifically to determining certain activities of a virtual machine (VM).

2. Background

In a typical system utilizing virtualization technology, the physical computer on which a virtual machine is running (i.e., the host machine or host computer) has the ability to determine information about that virtual machine. The virtual machine itself, however, does not have the ability to determine information about the host machine on which that virtual machine is running. No mechanism exists in either the virtual machine itself or the operating system of that virtual machine for determining the host machine on which it is running. Accordingly, it is not possible to determine how a particular virtual machine ended up on a particular host machine (including whether it was copied or cloned, for example).

If a virtual machine can determine the host machine on which it is running, the virtual machine (possibly in conjunction with a separate administrative console) can decide whether or not it should be executing. Further, knowledge by a virtual machine of the host machine on which it is running can facilitate virtual machine tracking. For example, virtual machines that are created for a hypervisor (i.e., a virtualization platform that can be used to run different operating systems and associated applications on the same physical or host machine) can easily be moved, duplicated or cloned to run on another hypervisor. When a virtual machine is moved or duplicated, the MAC address of the virtual machine remains the same as the parent virtual machine. When a virtual machine is cloned, the MAC address of the virtual machine is changed from the parent virtual machine. Two duplicate virtual machines will create network problems if they are running in the same network. Two cloned virtual machines can create problems if they are running the same network services, and these services collide when they are in the same network.

Tracking the lineage and migration of a virtual machine has multiple purposes. The ability to determine if a virtual machine ever ran on a specific hypervisor can be used to determine which virtual machines ran on a compromised or corrupted hypervisor. The ability to determine which virtual machines were the parent of a virtual machine, and at what time the lineage split, and can be used to determine which virtual machines have attributes added to the virtual machine lineage at a particular place and time.

A need therefore exists for establishing a messaging channel between the host machine and the virtual machine. This can allow the virtual machine to identify the host machine on which it is running and allow various activities to take place that otherwise would not be possible. This can then lead to the ability to track virtual machines throughout the enterprise.

For example, the virtual machine can keep track of the host and determine whether the host has the ability to manage that virtual machine. Additionally, the virtual machine can determine if it is still running on the same host as some previous time or if it is running on a different host. When utilizing an administrative console as described herein, this can allow for tracking of movement of virtual machines.

To provide this view to the virtual machine, a network packet-based communication path is needed for the messaging channel. Such a communication path must support different packet intercept/processing methods (depending on the operating system and hypervisor installed on the physical machine).

SUMMARY

In accordance with an embodiment of the invention, a virtual machine can be tracked by compiling information the virtual machines in a network and sending the information about the virtual machines to an administrative console. The administrative console can receive the information about the virtual machines and determine the status of the virtual machines in the network. Additionally, the administrative console can establish a lineage of a virtual machine and the migration of a virtual machine from one host machine to another host machine.

In a further embodiment, a virtual machine unique identifier assigned to each virtual machine by the system can be modified and used to track each virtual machine and associated host machine. From this, a parent virtual machine of each virtual machine based on the transitions of each virtual machine unique identifier can be determined and a timeline can be established for when the virtual machine was running on those host machines. Further, comparisons between information that has changed and that has not changed can also be used to track the virtual machines. That information about the virtual machines can include a MAC addresses of the virtual machine, the devices in the virtual machine, a name of the virtual machine, a unique identifier to track the virtual machine, a location of the persistent storage of the virtual machine, and a virtual machine unique identifier assigned to each virtual machine. A status can then be determined of the virtual machines, where the status can be a new virtual machine, a previously discovered virtual machine, a duplicated virtual machine, or a cloned virtual machine.

In another embodiment, a virtual machine can be prevented from operating by determining if the virtual machine is a duplicate or clone of an existing virtual machine and, if so, instructing the host machine on which the duplicate or clone virtual machine is running to prevent activity by the duplicate or clone of an existing virtual machine. This can include blocking any communications by the duplicate or clone virtual machine sent to the network or powering down the duplicate or clone virtual machine.

DETAILED DESCRIPTION

In a system utilizing virtualization technology, a communications mechanism can be established between the physical computer (i.e., host machine) on which a virtual machine is running and the virtual machine itself. The host would then have the ability to determine information about that virtual machine and the virtual machine would have the ability to determine information about the host machine on which that virtual machine is running. That information could then be used to determine the lineage of various components in the associated virtualization environment and to determine whether any particular virtual machine is a copy, clone, or rogue copy.

Various embodiments of this mechanism and an exemplary process for installing it are described in the following subsections. As indicated, this mechanism could be remotely distributed from a single hardware platform to one or more nodes within an enterprise network. The mechanism could be installed in stages and each stage can be selected with the characteristics of that node in mind. The configuration at any given mode could comprise an observation functionality, an analysis functionality, a reporting functionality, a remediation functionality or some subset of those functionalities.

Figure 1:
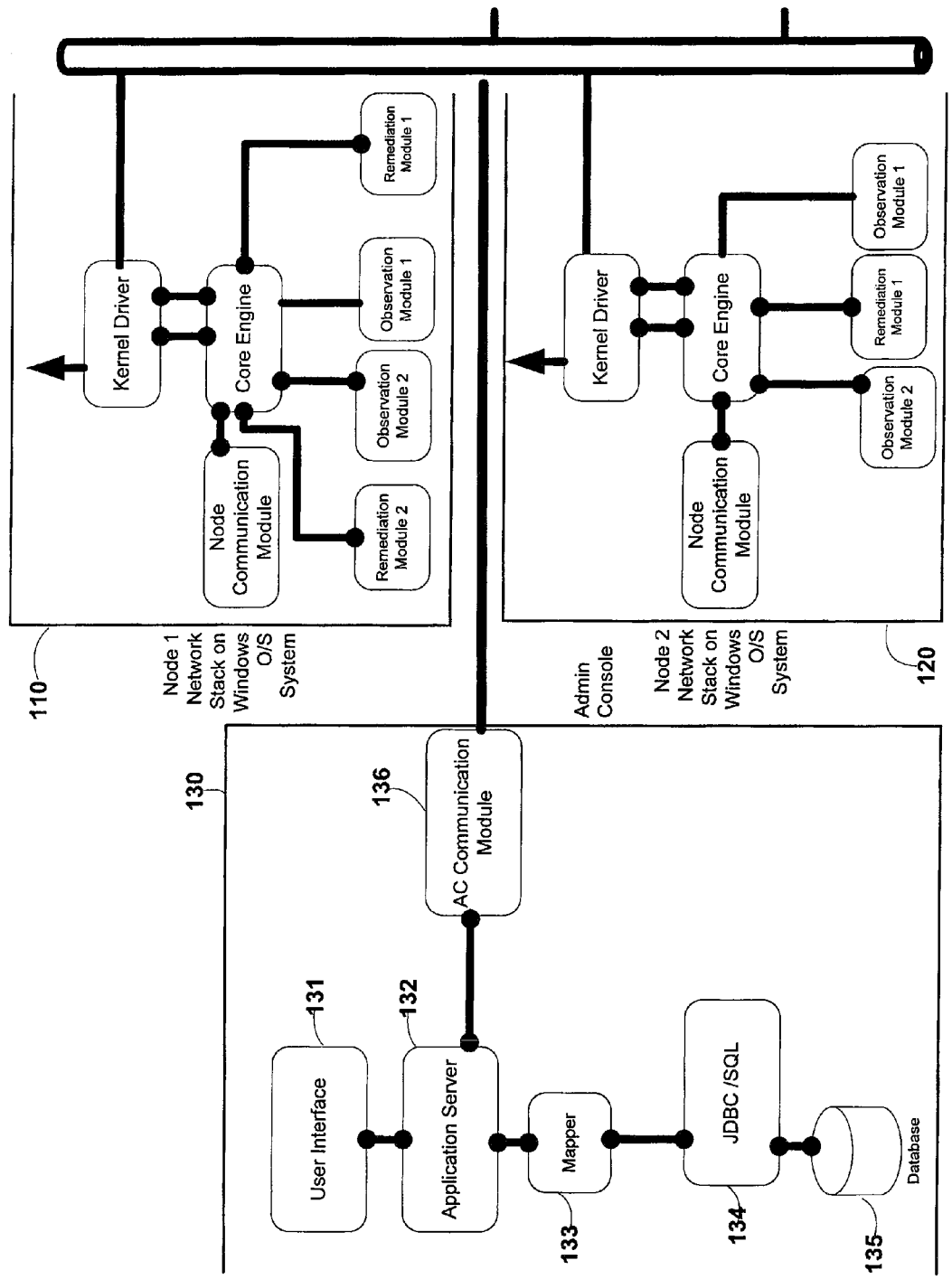
FIG. 1 illustrates an example of a high level component architecture usable in an embodiment of the invention.

FIG. 1 illustrates an example of a high level component architecture usable with an embodiment of the present invention. In this exemplary arrangement there are two network nodes 110 and 120 shown, although the number of network nodes is not intended to be limited to two. Additionally, while the network nodes are shown to be similar, they may be very different without affecting the use of the invention. The network nodes are coupled for data communication flow via a data transmission medium. The transmission medium could be wired, wireless, or some combination thereof and its type is not relevant to practicing the invention. In this embodiment, another computer platform 130 can be in communication with the network nodes via the data transmission medium. In this example, that platform is called an administrative console (AC), which will also be a trusted peer to other trusted peers in the network.

In this example, the AC has at least the following components: user interface 131, application server 132, mapper 133, JDBC/SQL 134, database 135 and AC communication module 136. The AC propagates the security mechanism out to the various network nodes via the data transmission medium. It might propagate the mechanism in stages so as to first cause a receiving network node to install the core aspect or core engine of the mechanism when a user of the node logs in. The installation is designed to be transparent to the user and the core engine is hooked into the stack of the operating system of the node. This installation thus yields the disposition of the core engine and kernel driver as shown in each of nodes 110 and 120.

Once the core engine component is installed, the AC may send a communication module component that enables data traffic pertaining to the collaboration mechanism functionality to be conveyed or communicated to and/or from that network node. These components are shown as the node communication modules in each of nodes 110 and 120. Collectively, the core engine, the node communication module, and the additional modules described below comprise a set of functional modules.

Once the node communication module is installed, the AC can forward one or more observation modules to the node. Examples of types of observation modules will be described below. Each such module can be designed to receive data packets intercepted between an adapter driver and a protocol layer of the node's operating system and then analyze the data packets to determine whether they are indicative of some activity or behavior of interest.

In one possible embodiment, the user interface of the AC will present a security dashboard to an operator. The dashboard will facilitate operator actions intended to remotely install, execute, report on and manage the state of the enterprise from a single geographic location.

In addition to illustrating components of interest, FIG. 1 illustrates example packet flows that indicate those packets directed to the security mechanism, packets that are target packets, that is packets of interest to the security mechanism, and flows where the packets are mixed, that is where there are target packets and security mechanism packets. In this example, the packet flow between the highlighted components with AC 130 are directed to the security mechanism, as is the traffic between the core engine and the node communication module within a node. The traffic between the core engine and the observation modules and remediation modules pertains to the target packets. The remainder of the illustrated data packet flows can be considered mixed.

Figure 2:
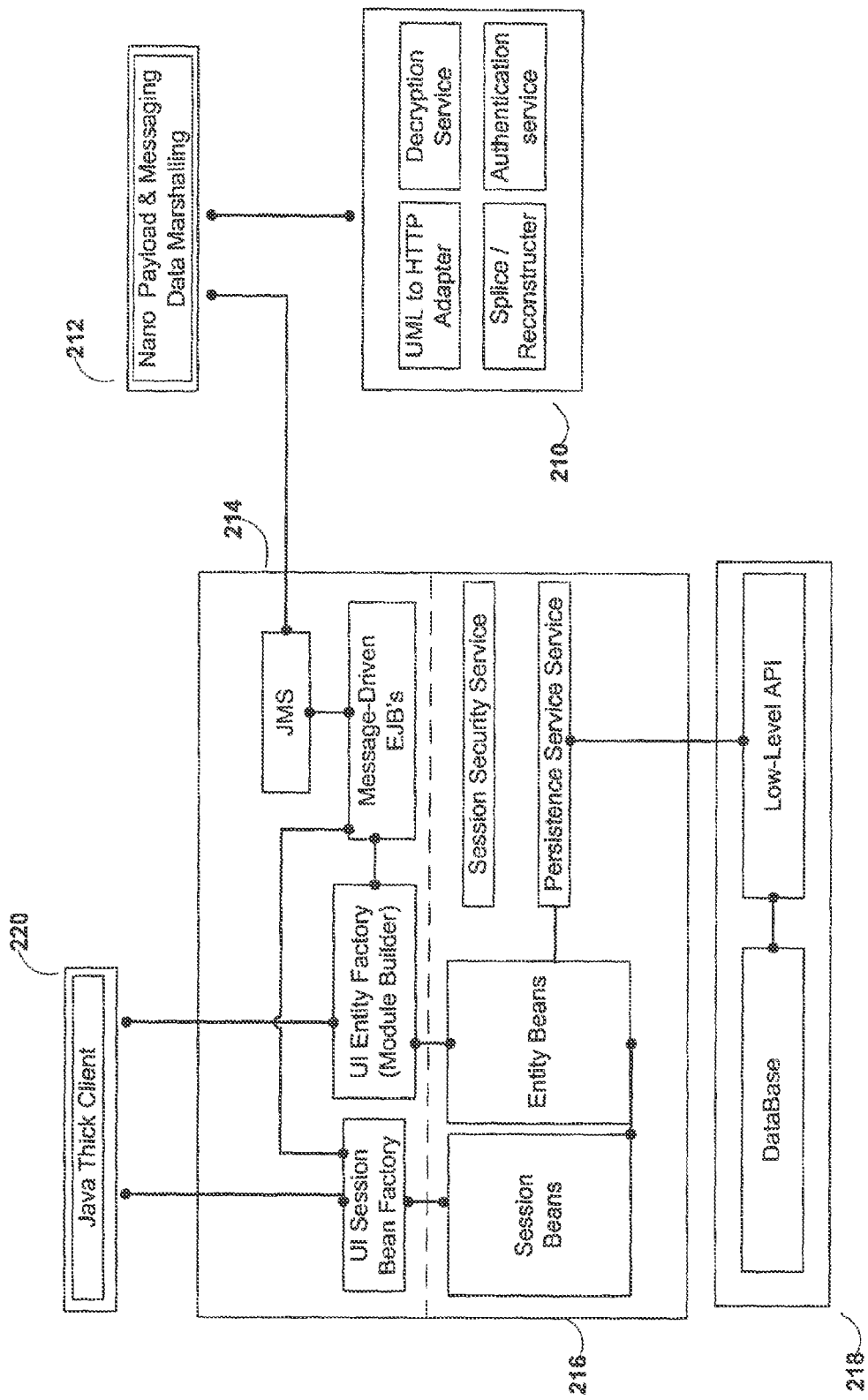
FIG. 2 illustrates an example of a high level component architecture of a central node usable in an embodiment of the invention.

FIG. 2 illustrates an example of a high level component architecture that could be used to implement an administrative console having the features and functionality of that described above in relation to FIG. 1.

In the example of FIG. 2, the AC can include six major components, a communication package 210, an object adapter 212, an EJB Servlet container 214, a J2EE Application Container 216, a data store 218, and thick client 220.

In one example configuration, data store 218 can include a relational database to store all persistent data pertaining to the security mechanism. This data can include, but is not limited to, system configuration information, system state information, activity reports from node modules such as from a communication module, an observation module or remediation module. The database could additionally store module activity event configuration, network topology data, node inventory data, operator credentials, and operator activity log data. Thus, the AC can monitor, track and act on information detected and/or collected by the security mechanism at the respective nodes. As a consequence, an operator or system monitor can prescribe further security-related activities to the network via the various network nodes. Also, because the AC can see the reports of multiple nodes, it can detect security attacks that might not be detectable by a single network node operating on its own.

Figure 3:
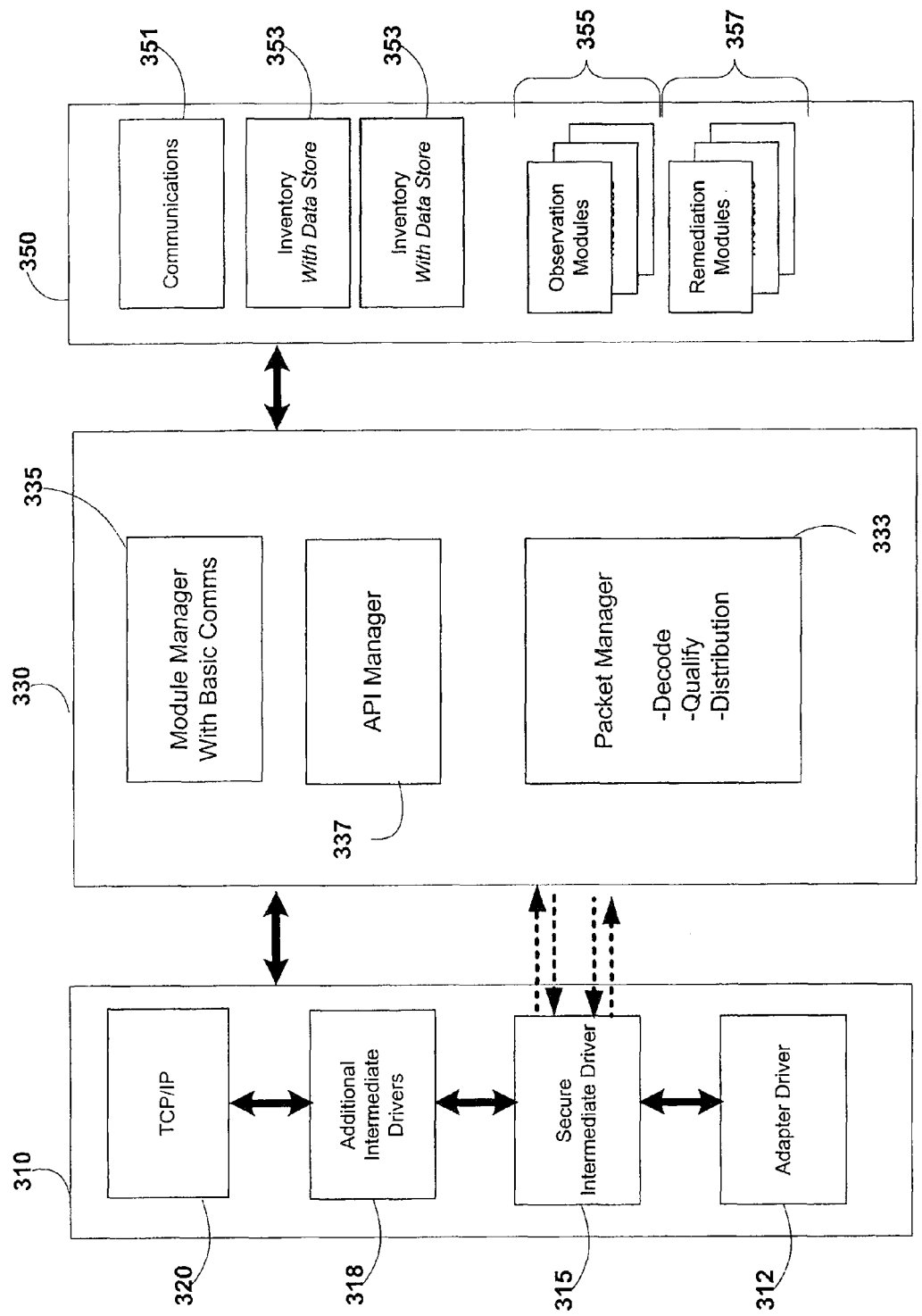
FIG. 3 illustrates an example of a high level component architecture of an installed detection arrangement usable in connection with the arrangement of FIG. 1.

FIG. 3 illustrates an example of a high level component architecture which could be used in the arrangement of FIG. 1. This exemplary illustration shows three major components of the network node, the network stack 310, a core engine 330, and a modules component 350. In accordance with this embodiment, a kernel driver (SID) 315 is installed in the network stack, at the bottom of that stack, adjacent to adapter driver 312. As illustrated the network stack might also include additional intermediate drivers 318 between the SID 315 and the protocol layer, here TCP/IP 320. The SID 315 is one example of a packet driver that can intercept data packets from the network stack for processing by the remainder of the security mechanism. Specifically, once a packet is intercepted, it can be provided to the core engine (CE) which as shown in FIG. 3 can include a module manager 335, an API manager 337 and a packet manager 333. The CE will decode, qualify and route packets to any module which needs to process the packet. The CE can even be dynamically updated at run time.

The modules for observation and/or remediation are associated with the module component 350. In this example, the module component includes communications capabilities 351, inventory data stores 353, one or more observation modules 355 and one or more remediation modules 357. These observation and remediation modules are intended to handle the details of the packet processing operations. The modules also can be dynamically updated.

The above-described architecture is designed to include multiple strategies for packet drivers. An appropriate packet driver for a particular customer or node will depend on customer requirements. While the specifics may vary, it is beneficial if a packet driver has one or more of the following characteristics:

1. it intercepts packets as close to the adapter driver as possible;
2. it allows the packet driver to be re-installed if disabled by user control;
3. it detects whether the connection to the adapter driver is hooked/intercepted/tampered with in any way; and
4. persists in the core engine in non-volatile memory and load and execute the Core Engine.

Additionally, the Kernel driver described above can be designed so that, for example in a Microsoft operating system environment, it will effectively look like an adapter driver to the protocols and a protocol to the adaptive driver. The SID can then forward all of the packets to the CE and it can effectively forward all packets between the protocols and the adapter driver transparently if desired.

Figure 4:
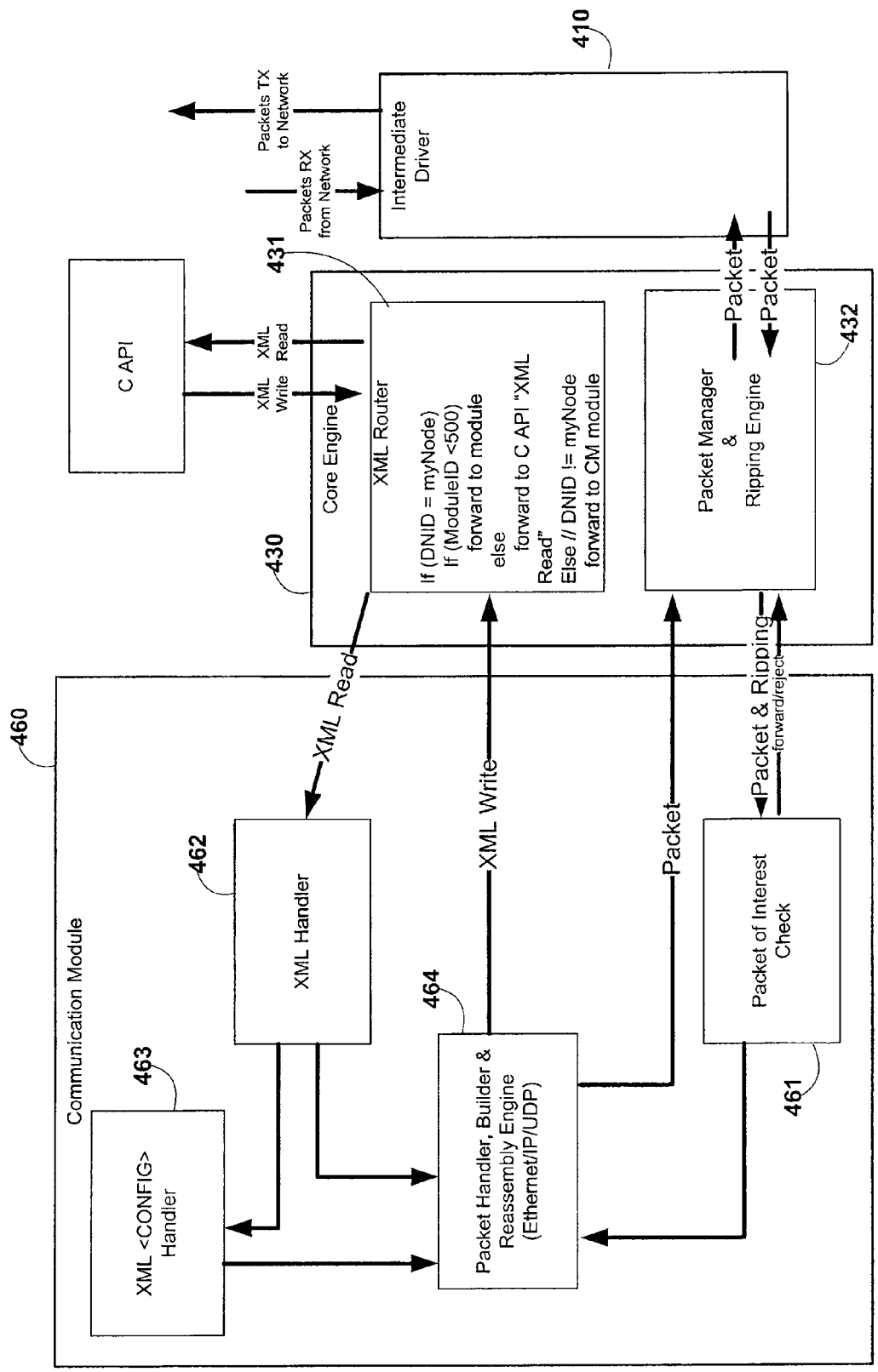
FIG. 4 illustrates another high level view of an installed detection arrangement along with exemplary packet flows.

FIG. 4 provides another component level diagram of an aspect of the security mechanism that can be installed in a node such as in FIG. 1. In this illustration additional features of the Core Engine are illustrated and aspects of a communication module, such as element 460 in FIG. 1 are shown in detail.

In FIG. 4 an intermediate driver 410 receives packets from the network and transmits packets to the network. This could be the SID described above. The intermediate driver intercepts packets from this flow and provides them to the CE 430. In this illustration two aspects of the CE are referred to, XML router 431 and Packet Manager and Ripping Engine 432. The intermediate driver exchanges packets with Packet Manager and Ripping Engine 432. As will be described in connection with FIG. 5, the Core Engine will forward packets to/from the drivers to any module that is registered to receive that traffic. In this illustration, however, the focus is on communications, particularly between this instantiation of the security mechanism and another instantiation of the mechanism at another node or with the Administrative Console.

In the arrangement of FIG. 4, the XML Router interacts with C-API, a device that has a read/write interface that enables the AC to communicate with elements of the security mechanism. Furthermore, the XML Router and the Packet Manager and Ripping Engine interface with communication module 460. The Packet Manager and Ripping Engine sends an intercepted packet to the Packet of Interest Check 461. If the packet is of interest it is queried for processing by the Packet Handler, Builder and Reassembly Engine 464 which is responsive to XML Handler 462 and XML Handler 463. The result is that the communications module will take any XML message destined for another security mechanism and package that message into an Ethernet message. The Ethernet message is sent back to the Packet Manager in the CE and is forwarded to the Intermediate Driver for transmission on the network.

Figure 5:
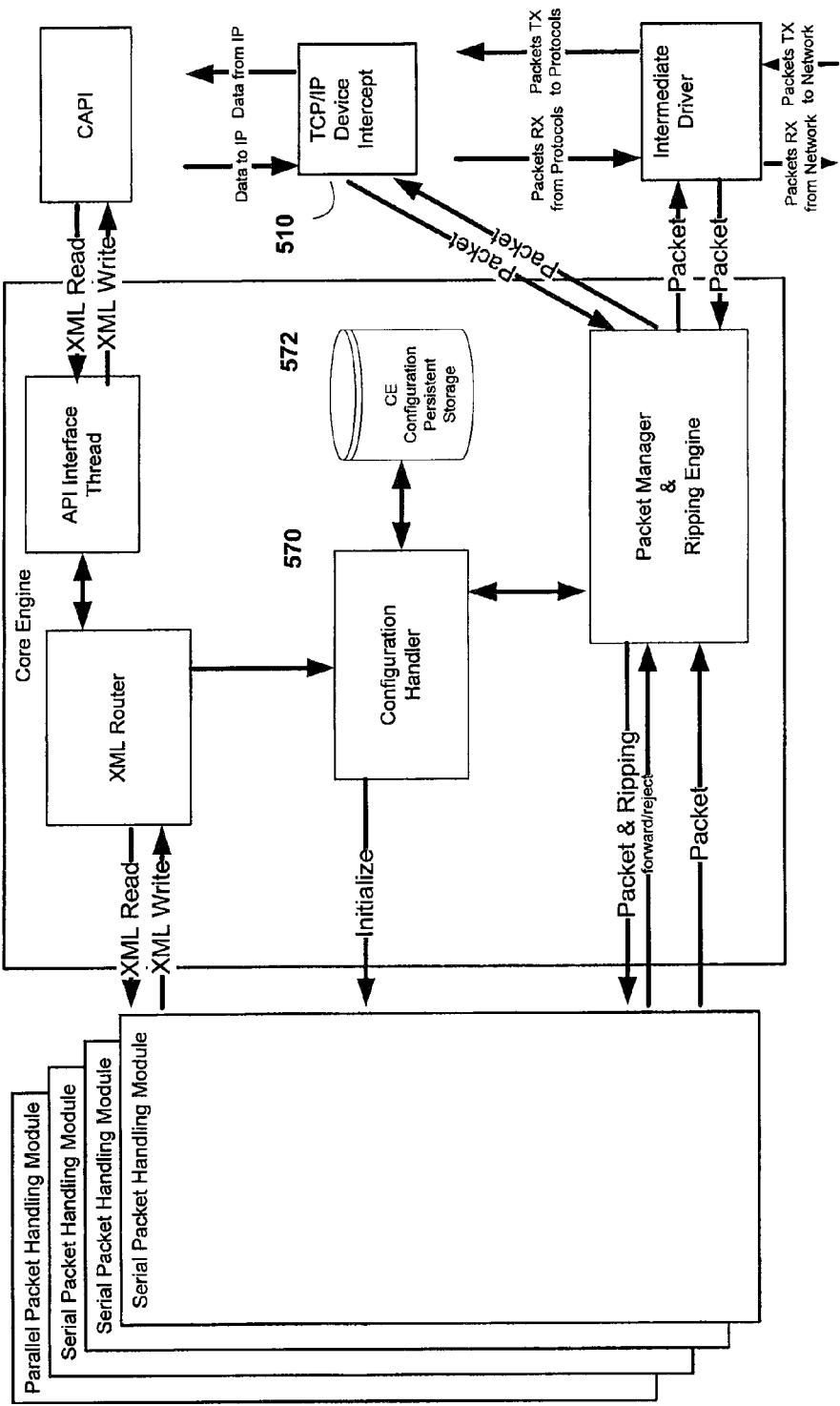
FIG. 5 illustrates an example of a component level arrangement usable in a configuration such as FIG. 4.

FIG. 5 provides another component level view of aspects of the Core Engine. In this illustration, the Core Engine is shown interfacing with the C API and the intermediate driver as in FIG. 4. However, this illustration shows the CE interacting with one or more modules and with a TCP/IP Device Intercept. Also, this arrangement shows more aspects of the CE.

In this arrangement, the CE's Packet Manager and Ripping Engine exchanges packets with the intermediate driver, as above, and with the TCP/IP device intercept 510. The Packet Manager and Ripping Engine further exchanges packets with various handling modules as appropriate.

Within the CE, the API interface thread handles the read/write interface from the CAPI as described above with respect to FIG. 4. The XML Router performs the same functions as in FIG. 4 but is now shown to interface more specifically with a configuration handler 570 that has associated CE Configuration persistent storage 572. The Configuration Handler is a thread that will process all CE <CONFIG> messages and will persist the current configuration so it can be retrieved on any re-start. This might even include information about any of the modules that have been installed in the system.

Figure 6:
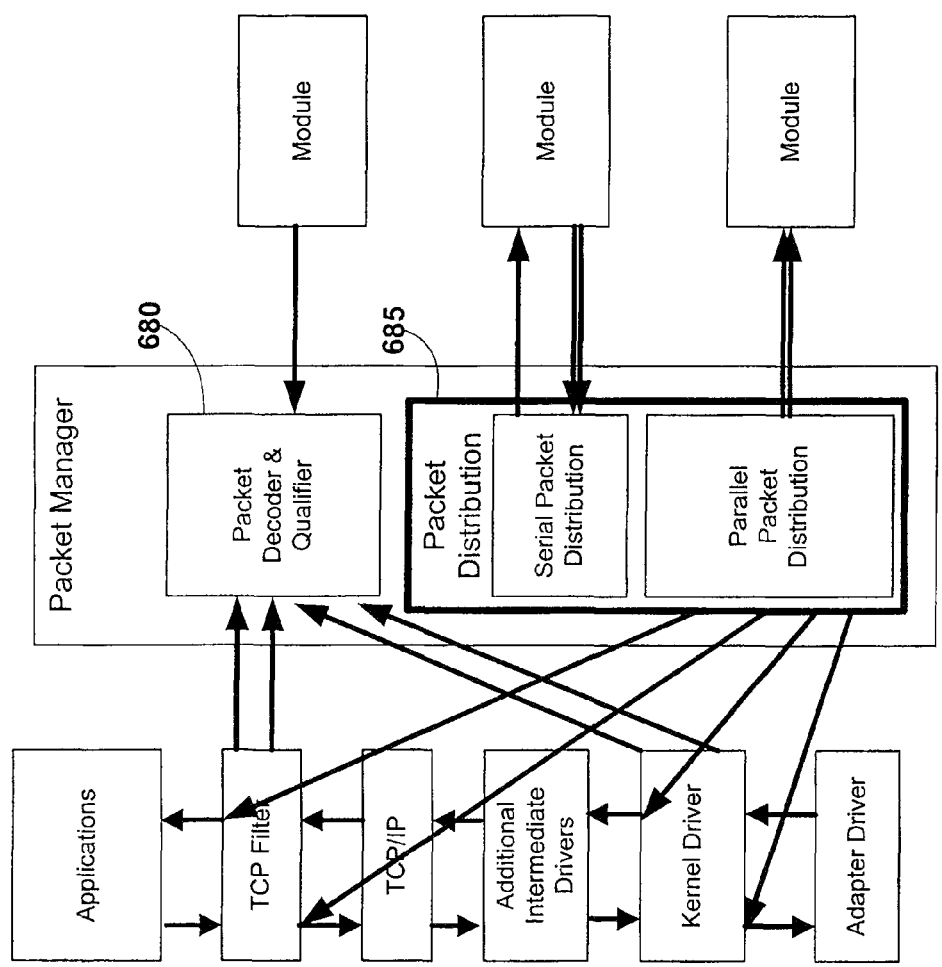
FIG. 6 illustrates an overview of an example of a packet manager usable in a configuration such as that illustrated in FIG. 4.

FIG. 6 provides an illustration of an example of an arrangement of a packet manager (PDM) that could be used in the configurations above, along with items with which the Packet Manager can interact. In the overview shown in FIG. 6, the Packet Manager can include a Packet Decoder and Qualifier 680 as well as a Packet Distribution element 685 that can adapt to either serial distribution of packets (sending the packet to a first module and when processing is complete sending it to a second module) or a parallel distribution of packets (sending a packet to multiple modules in parallel).

As illustrated in FIG. 6, the Packet Decoder can receive packets from the kernel driver and/or a TCP filter. The TCP filter could be a TCP/UDP/Raw filter used to intercept packets/data to and from the TCP/IP device, the UDP device and the Raw device. This will allow a module to receive traffic before it reaches the TCP/IP stack from an application. As in prior descriptions, the Kernel driver will be used to intercept packets from any protocol device or any additional intermediate drivers that are installed in the stack, and from the Adaptive Driver.

The PDM will get packets from each connection to the TCP/IP device. In the case where there are multiple TCP/IP addresses the PDM could identify each connection with a unique identifier. This connection identifier will have correlating information stored in an Inventory Module which is described below. The PDM will also get packets from each adapter driver that is currently installed in the system. The PDM will also identify each packet stream to/from the adapter driver with a unique identifier.

The PDM allows modules to request packets/data from each potential source. The PDM has two specific request types; the first is a serial "forward" of the packets and the second is to forward the packet information in parallel with a "smart pointer". Modules that request a serial "forward" of the packets/data will have the potential of modifying the data before the data is forwarded onto the next module or the egress of the PDM. The PDM will allow the modules to specifically ask for traffic from a specific point in the network stack (i.e., egress down from a specific TCP/IP device connection, or ingress up from the adapter driver), or from a specific direction to/from all connections in the network stack (i.e. ingress up from all adapter drivers).

The PDM will perform packet decodes (as much as possible) on all packets/data received by the PDM. The PDM will allow modules to ask for packets/data based on decoded packet/data information.

The following is a list of features that the PDM could be configured to handle:

1. The PDM will obtain traffic flows to/from the Adapter Driver with a connection that is as close to the Adapter Driver as possible.
2. The PDM will obtain traffic flows to/from the TCP/UDP/Raw filter with a connection that is as close to the Applications as possible.
3. The PDM will allow modules to register for serial packet/data forwards based on a specific location and unique device, based on a specific location for all devices, or based on a decoded packet filter.
4. The PDM will allow the modules to modify the serial packet/data traffic and will forward the modified data.
5. The PDM will allow modules to register for parallel packet/data traffic. The PDM will distribute this information using "smart pointers". Modules are not allowed to modify packet/data traffic received with a parallel packet registration.
6. The PDM will allow modules to register for parallel packet decodes information to be sent to the module. The PDM will distribute the packet decodes information using smart pointers.
7. The PDM will allow modules to specify the priority of the filter for serial packet forwarding, parallel packet forwarding, and parallel packet decode forwarding for packets/data received at any specific location. The priority of the filter will determine what order packets will be forwarded to a module. A module may specify a different priority for packets received at different points. For example a module may specify a high priority for packets received on the ingress from the adapter drivers so that it sees packets before any other modules for traffic on the way in, and specify a low priority for packets received on the ingress from the protocol drivers so that it sees packets last after any other modules for traffic on the way out.
8. The PDM will allow modules to "kill" packets/data so that the data is no longer forwarded. This will allow a remediation module to block all packets to/from devices as required.
9. The PDM will allow modules to generate new packets/data to/from any connection point.

As illustrated in many of the drawing figures and as discussed above, the security mechanism can be deployed within a node with one or more modules such as observation modules and remediation modules.

Modules could have a variety of functionality. Some modules could gather computer inventory, some modules could gather network topology, some modules could perform behavior analysis on the network traffic, and some modules could remediate network traffic. All modules in the system must be designed against a set of generic requirements for modules. The generic requirements are as follows:

1. Modules will be installed by the Core Engine and be coded to operate in kernel space or user space.
2. Modules should be able to be uninstalled on demand at run-time.
   a. When a module is asked to uninstall it should clean up all resources, and then inform the CE that it is ready to be uninstalled.
3. Modules should have the ability to persist information.
   a. Modules can temporarily ask the CE to persist some memory. This should be used when a module is being upgraded but information needs to be passed between the old and new module. In this case the CE will be passed a block of information that will be kept in memory.
   b. The modules will use a set of library functions to persist information to the hard drive or other persistent memory in the system. These library functions will encrypt the data, and obfuscate the data to avoid disseminating information to the modules.

As indicated above, the communications module will be used by all other modules to communicate with the Administrative console. The communications module (CM) may have multiple modes of communication that it can use, including:

1. Ethernet Broadcast packets—These broadcast packets may not use IP, and therefore may not be routable. However, other nodes which can see these messages may route them to/from the AC.
2. Internet Protocol packets—This will be a standard Internet Protocol based packet stream to the AC.
3. Secure communications—This will use a secure packet transfer mechanism which will allow for a secure, tamper resistant, and authenticated packet stream to the AC.
4. Covert communications—this will use normal IP traffic streams and embed covert communications in to the stream so that communications can not be easily traced.

The following features may be desirable for the CM:

1. Receive, authenticate, validate, and decrypt all messages from the AC. Encrypt, create a message integrity check, sign, and send all messages to the AC.
2. Receive all module creation messages, and when a module is complete authenticate, validate, and decrypt the module. Send the module to the module manager for installation.
3. Route all messages received to the proper module or modules.
4. Handle multiple priority messages from various modules and send those messages in the order required based on priority. The CM should be able to stop sending a lower priority message that has been partially sent in order to send a higher priority message. The CM should resume sending the lower priority message when possible, with out retransmitting the entire message.

Other potential modules that might be used include an Inventory Module (IM), a Discovery Module (DM), Remediation Modules (RM) and Observation Modules (OM).

The IM could be used by all other modules to get inventory information about the computer. The IM could track information like the following:

1. What network cards are installed in the system, and will generate a unique identifier for traffic to/from the network card. The IM will attempt to determine the type of network card; including, wireless, Ethernet, GigE card, and etc. Will determine if Microsoft VPN services are configured on the system.
2. What protocols are installed in the system, and will generate a unique identifier for the traffic to/from the protocol.

3. The software packages that are installed on the system.

The DM could be used by all other modules to get discovered network information. The DM could maintain information like the following:

1. The MAC addresses of any computer that has been seen on the network.
2. The IP or other network address for any MAC address seen on the network.
3. Duplicate IP addresses will be managed.
4. Multiple IP addresses from a MAC address will be managed.
5. The NNE status of computers seen on the network.
6. The packet counts and octet counts for data sent between computers seen on this network.

RMs could perform remediation against network traffic flows. These may be flows detected by Observation Modules (OMs) that are originating from malware, flows blocked by AC configuration, or other network traffic flows identified by any Observation Module (OM). Remediation may be blocking the traffic flow, resetting the traffic flow, or spoofing that the traffic flow is proceeding while blocking the flow (i.e., like a honey pot).

Initially the RMs will be "dormant" and not have any packet filters registered. They will register their APIs to the API Manager in the CE. If an RM receives a configuration message from the AC or an OM to filter a specific network traffic stream, then it will use the API manager to get the Packet Manager API, and register a serial packet filter for the traffic stream. When that packet stream is delivered to the RM, then it can perform remediation.

Typically, the RM will be required to perform the following:

1. Receive remediation requests from the AC or OMs.
2. Use the IM to determine the appropriate packet filters to use to remediate the request.
3. Register with the Packet Manager for the appropriate serial packet filters.
4. Remediate the traffic received from the Packet Manager.

OMs could perform behavior analysis on the various network packet flows received by the security mechanism. There will be different type of OMs that will look for different network behaviors. The OMs will use the other modules in the system to perform the behavior analysis.

The OMs will be required to perform the following:

1. Use the IM to determine the appropriate packet filters to use for the OM to operate properly.
2. Register with the Packet Manager for the appropriate serial or parallel packet filters.
3. If required, use the DM to get network topology information.
4. When required issue alarm information via the CM to the AC.
5. When requested issue status information via the CM to the AC.
6. If required, receive configuration information and persist that configuration information.
7. When required issue requests to the RM to provide remediation.

Figure 7:
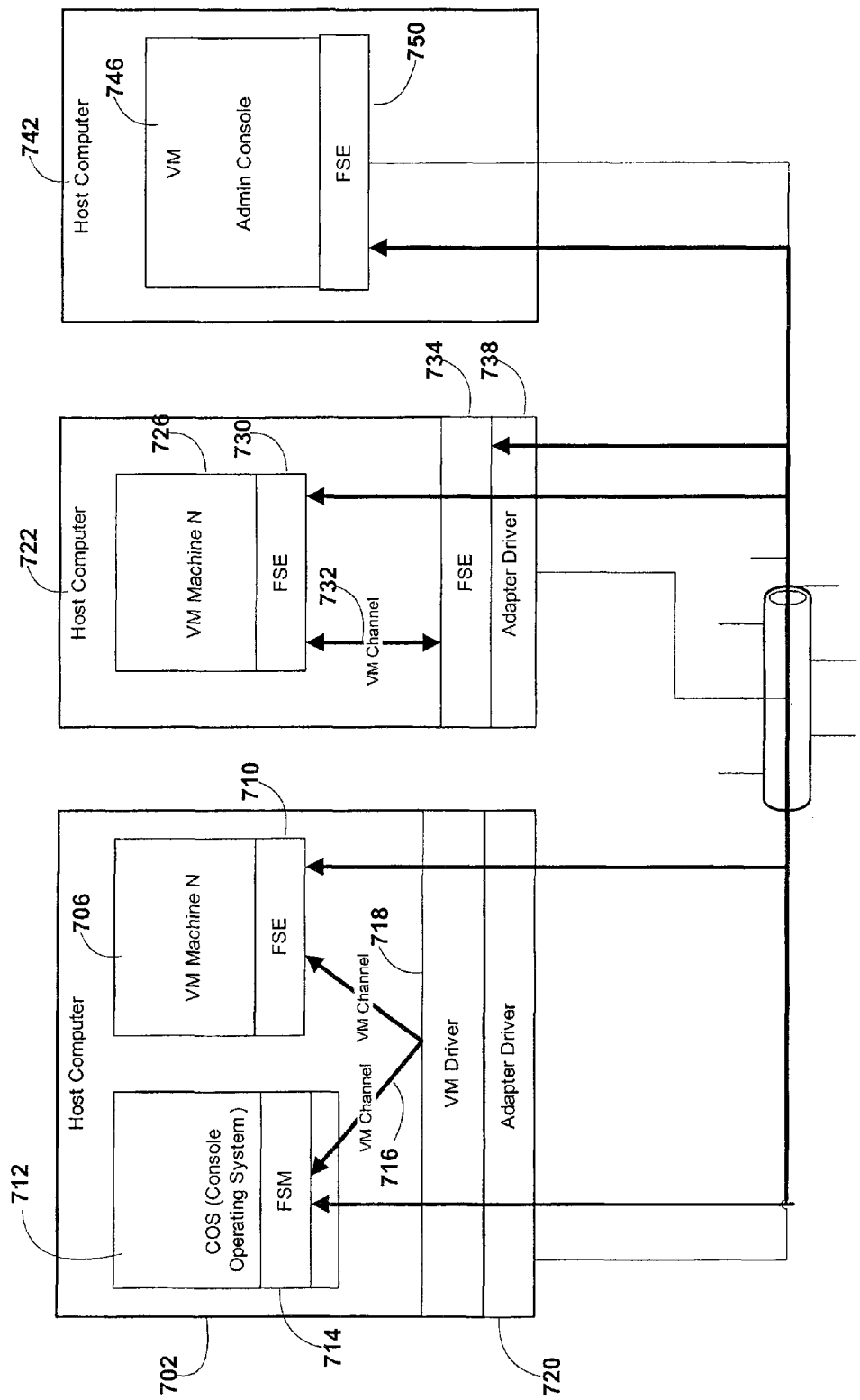
FIG. 7 illustrates an example of various host machine architectures that contain a messaging channel.

FIG. 7 is a block diagram that illustrates an example of various architectures that could be used for allowing a virtual machine (VM) to determine the host machine on which that VM is running. In FIG. 7, two host machines 702 and 722 are depicted each containing a VM, along with host machine 742 that contains administrative console 746. As discussed below, a host machine can comprise a hypervisor.

In order for a VM to determine the host machine on which it is running, a messaging channel can be established between the VM and the host machine. The method for communicating over such a messaging channel is via a set of network-based packet messages (which are further described in the context of FIG. 10). In various embodiments, pre-configuration of the virtual machine or the host machine would not be required (i.e., the messaging channel utilizes existing communications paths). In such embodiments, the host machine can discover all known running virtual machines in real time.

In an embodiment, host machine 722 can contain VM 726. A virtualization engine 730 (denoted FSE in FIG. 7) can be associated with VM 726 and can be used to provide various capabilities related to determining the host machine on which VM 726 is running. Virtualization engine 730 (and any other virtualization engine) can comprise the core nano engine and nano modules as described in the discussion of and shown in FIG. 3.

To provide a messaging channel (i.e., VM channel 732) between host machine 722 and virtual machine 726, host machine 722 also can have a virtualization engine 734 installed that is a complement to virtualization engine 730 in VM 726. In an embodiment, virtualization engine 734 can be a network layer driver installed below the TCP/IP protocol stack and above adapter driver 738 in the network stack (as shown in FIG. 3). In such a scenario, host machine 722 can intercept packets intended for VM 726 and return messages back to VM 726.

A mechanism that can be used for determining the host machine on which a virtual machine is running can be implemented utilizing a communications module (CM) within virtualization engine 730 that can communicate with a corresponding virtualization engine 734 that has been installed directly above adapter driver 738. The CMs within virtualization engines 730 and 734 that establish VM channel 732 could be simply components of the communication module 351 shown in FIG. 3 that is resident in each of the respective virtualization engines 730 and 734.

The CM contained in virtualization engines 730 and 734 can provide the support for the messaging channel between host machine 722 and VM 726 to exchange unique identification indicators. In particular, host machine 722 and virtual machine 726 can be assigned unique identifications (including, for example, a node ID and a machine-unique ID (MUID)) from administrative console 746 within host machine 742. Host machine 722 can provide the MUID from host machine 722 to virtual machine 726, which can allow virtual machine 726 to determine the host machine on which virtual machine 726 is executing.

For VM 726 to query host machine 722 for this information, a virtual machine monitor within virtual machine 726 can acquire the MAC address of and other information related to VM 726 (including, for example, BIOS information). If the MAC address and other information of VM 726 are determined to be within a predetermined set of values, then VM 726 can format a VM Host Query message as further discussed in the context of FIG. 10. Host machine 722 can process the Host Query and respond with a special VM Host Query Response message that contains information about host machine 722.

In an alternate embodiment where the network stack of a host machine and the network stack of a VM are independent and, therefore, processed directly by a hypervisor on the physical machine, host machine 702 can be configured to contain a console operating system 712 and a virtualization monitor 714 (denoted FSM). A virtualization monitor can be utilized when a particular host machine does not permit a direct installation of a virtualization engine (as was described above in the context of virtualization engine 734 being installed just above adapter driver 738 in host machine 722). In such an embodiment, VM 706 can communicate with host machine 702 via VM channel 716 that can be set up between virtualization engine 710 and virtualization monitor 714.

In both embodiments discussed above, the VM messages can be sent by setting the Ethernet/IP header in the message to broadcast mode. All of the VM to host machine messages are sent as broadcast messages unless the proper settings are discovered and used in advance. A broadcast message means that all machines connected to the network can see those messages.

Each VM can determine the host machine on which it is running via a Virtual Machine Host Module (VMHM) within the virtualization engines 710, 730, or 734, or virtualization monitor 714. Each VMHM can use messaging channels 716 or 732 along with the protocols described below to determine the corresponding host machines with which each VM is paired. Further, a VMHM within either a host machine or a VM can control access to a virtual machine and provide support so a VM can detect the host under which that VM is running.

When a VM starts or is resumed from a suspended state, the associated VMHM can send a message to the host machine. The host machine can respond with the NodeID of Host machine, where NodeID refers to a unique host identification value that can be provided by administrative console 746. If the host machine has not completed registration, then the host machine can respond with a MUID (Machine Unique ID) which the VMHM within the host machine will generate using the well understood NIC information from the HM. The AC can use the MUID and NIC information to create a "host machine node" to which the VM can be associated.

The method discussed above in the context of host machine 722 intercepts a broadcast VM message prior to it reaching the network and thus those broadcast messages never reach the external network. For the method discussed in the context of host machine 702 (i.e., where a virtualization monitor is utilized by the host machine to communicate with the VM), the hypervisor can intercept the data and if not, the broadcast VM messages can be sent into the network and can then make their way into the host. The respective host machine processes the VM messages only by getting the MAC addresses used on the physical machine from the hypervisor. The host machine can discard broadcast messages from VMs running on other hosts. Further, the host can provide a response directly to the VM that broadcast the initial message or via a corresponding broadcast message back to all VMs connected to the applicable network.

In an embodiment, a host machine can also attempt to contact all VMs directly running on that host machine by monitoring the network packets (if possible), tracking outgoing packets from the VMs, and storing the MAC addresses of those VMs. In an alternate embodiment where the host machine can not access the packets, the host machine can request the hypervisor for a list of MAC addresses that known by the hypervisor and messages can then be sent to the VM directly or via an Ethernet/IP broadcast message as described above.

Figure 8:
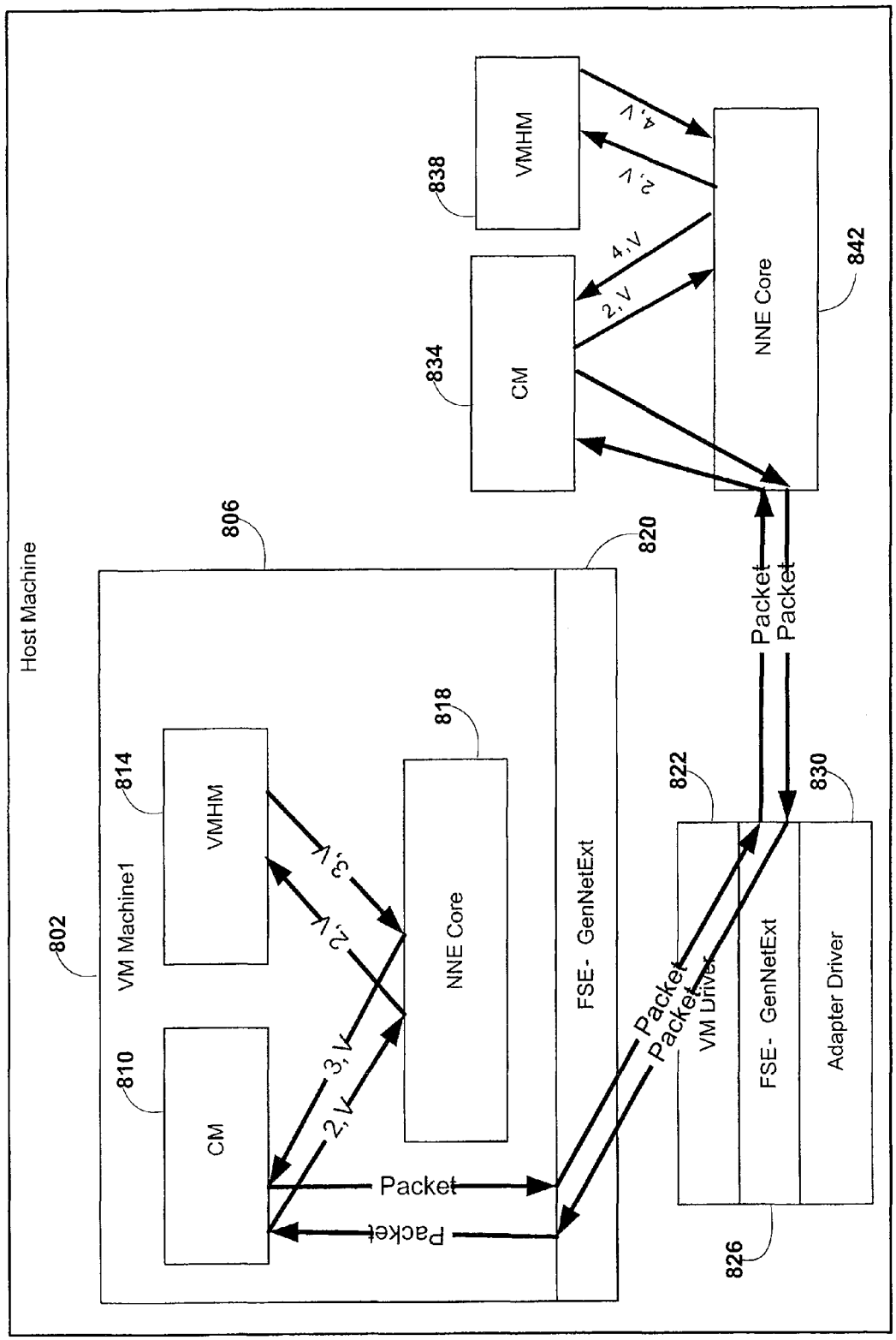
FIG. 8 illustrates an example of an arrangement usable in a configuration such as that illustrated in FIG. 7.

FIG. 8 depicts in further detail an example of a configuration that could provide the functionality of host machine 722 shown in FIG. 7. In FIG. 8, VM 806 can contain communications module 810 and a VMHM 814. Core engine 818 can exchange messages with both communications module 810 and the VMHM 814 that allows VMHM 814 to receive messages that originate from the virtualization engine running on host machine 802 (where the virtualization engine comprises communications module 834, VMHM 838, network layer driver 826 (shown as FSE—GenNetExt) and core engine 842). Communications module 810 can receive those messages via virtualization engine 820. Host machine can further contain VM driver 822 and adapter driver 830 that allow host machine 802 to communicate with both VM 806 and the network to which host machine 802 is connected (not shown in FIG. 8).

Figure 9:
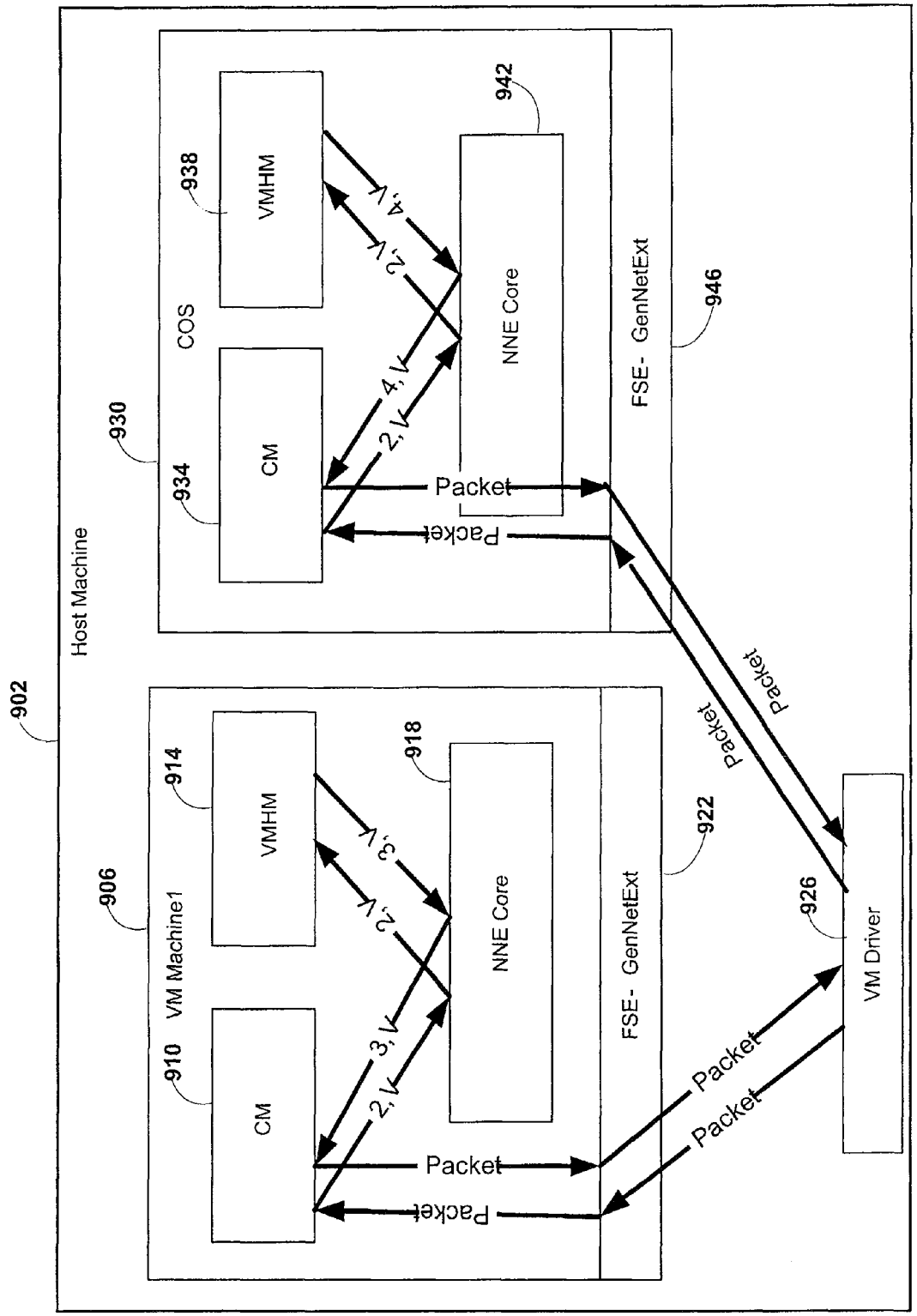
FIG. 9 illustrates an example of an alternate arrangement usable in a configuration such as that illustrated in FIG. 7.

FIG. 9 depicts in further detail an example of a configuration that could provide the functionality of host machine 702 shown in FIG. 7. In FIG. 9, VM 906 can contain communications module 910 and VMHM 914. Core engine 918 can exchange messages with both communications module 910 and VMHM 914 that allow VMHM 914 to receive messages that originate from the console operating system 930 running on host machine 902. Console engine 930 can contain a virtualization engine running on host machine 902 (where the virtualization engine comprises communications module 934, VMHM 938, network layer driver 946 (shown as FSE—GenNetExt) and core engine 942). Such an approach could be used when the network stack of host machine 902 and the network stack of VM 906 are independent. Communications module 910 can receive the messages from console operating system 930 via VM driver 926.

Figure 10:
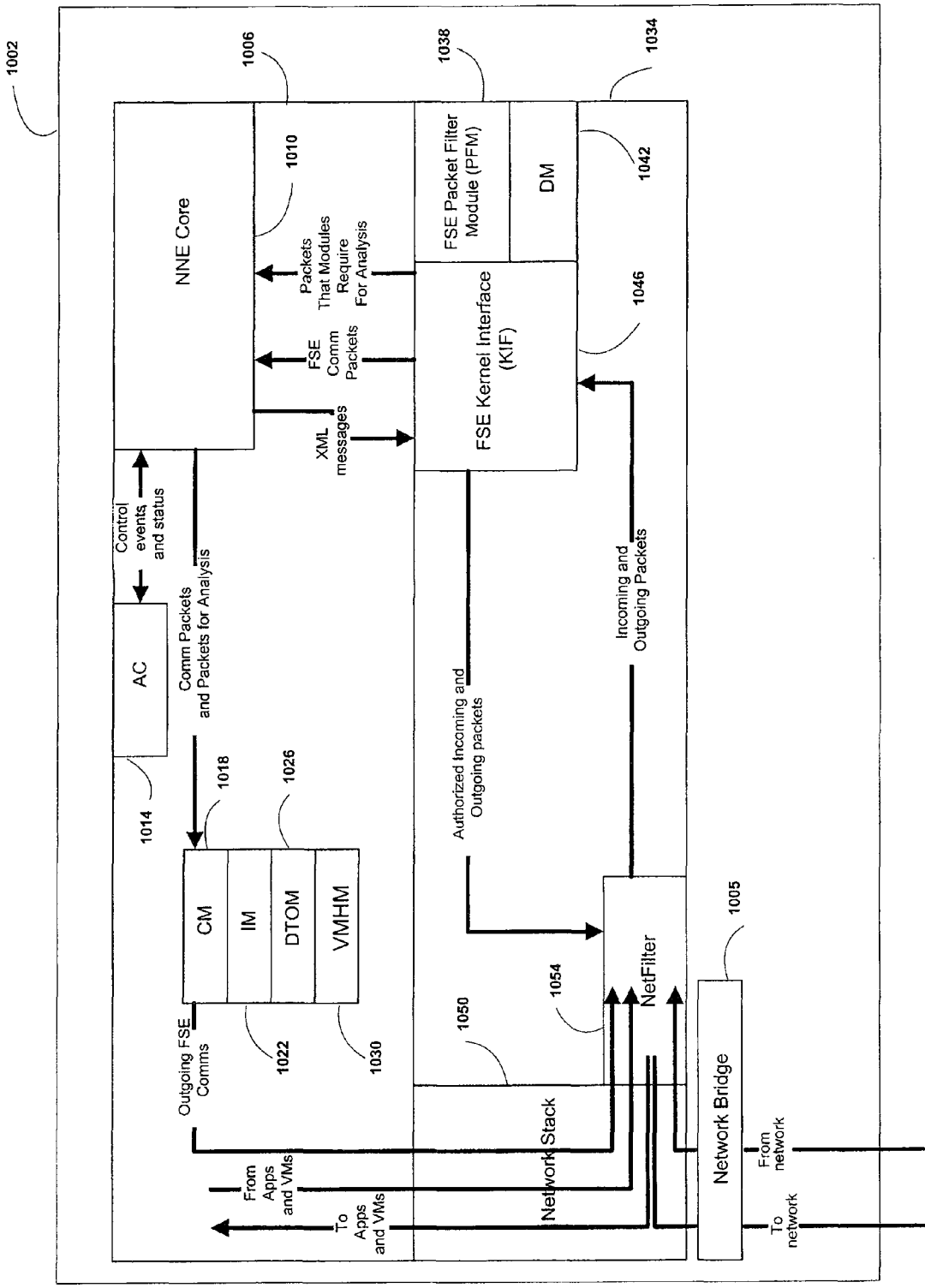
FIG. 10 illustrates an example of another alternate arrangement usable in a configuration such as that illustrated in FIG. 7

FIG. 10 depicts in further detail a configuration of a host machine that may only be able to attach to a network bridge and that network bridge may reside below the network stack of both the host machine and the virtual machine. Such an approach could be used, for example, with a Linux implementation. In such a case, the communication engine contained within the virtualization engine can be attached to network bridge 1050. In a Linux implementation, network bridge can comprise a packet handler in the Linux network stack for handling network traffic. In this scenario, host machine 1002 can only observe and modify network packets destined for VMs in user space 1006 but host machine 1002 cannot intercept the network-based messages. The host machine can process only VM message queries that are coming down the network stack into network bridge 1050. Messages coming up the stack from the network interface cards are not processed by the communication mechanism implemented within the virtualization engine.

In particular, in an embodiment involving a Linux integration of a virtualization engine, the functionality of the virtualization engine can be distributed amongst various components that reside in both user space 1006 and kernel space 1034. Most of the virtualization engine functionality can be implemented in user space for the Linux implementation. This can include NNE core 1010 as well as: CM 1018, IM 1022, DTOM 1026, and VMHM 1030.

Three components can be run in kernel space 1034 that can provide a messaging channel between host machine 1002 and a VM running on that host machine 1002. The first is a Linux Loadable Kernel Module (LKM) (also denoted as the FSE Kernel Interface (KIF)) 1046 which can provide a device driver to allow applications in user space 1006 to read and write into the kernel. This will allow the applicable components of the virtualization engine to pull out appropriate communications messages and pass them up to the user space virtualization engine components, as well as disable all unnecessary communications prior to authorization by virtual machine host monitor (VMHM) 1030. KIF 1046 can also provide a simple message router to route messages sent from user space 1006 to the appropriate kernel space virtualization engine module.

A second kernel level component can include Packet Filtering Module (PFM) 1038, which can be a configurable item to selectively filter out packets from both incoming and outbound traffic. This can be a simple enable/disable filter that can be hard coded with those packets the virtualization engine requires, and can filter as required by VMHM.

A third kernel level component can include Discovery Module (DM) 1042. This module can run in the kernel to allow it to efficiently monitor all communications without requiring sending all packets up to user space 1006. This will allow the Linux implementation of the virtualization engine to provide appropriate functionality.

NNE Core 1010 (as discussed earlier in the context of FIG. 1 through FIG. 3) will be running in user space 1006 and will retrieve packets marked for virtualization engine processing or analysis from the kernel components. NNE Core 1010 will manage loading and unloading the user space virtualization engine modules and routing messages to the appropriate module(s).

Each of the other modules that make up the virtualization engine (including, by way of example and not limitation, communications module (CM) 1018, inventory module (IM) 1022, DNS tracking observation module (DTOM), and virtual machine host monitor (VMHM)), will be running in user space 1006. Each of these modules will receive those messages that correspond to the information they utilize when they register with NNE Core to receive messages, and will process those messages as necessary.

In an embodiment, DM 1042 can keep track of located virtualization engine instances (whether in the form of a VM or a host machine). DM 1042 can periodically send out DM discovery request (DMDR) messages to find remote virtualization engine instances, as well as keeping track of all external virtualization engine instances that are found to be talking on the network. DM 1042 can also monitor all information exchanges to keep track of what connections are active and what connections are using what percentage of network bandwidth. To allow this level of functionality on Linux, DM 1042 will be implemented in kernel 1034 on the Linux platform.

In an embodiment, CM 1018 can provide basic communications between the local virtualization engine and external virtualization engines. In a Linux implementation, external communications can be relatively simple to handle, as CM 1018 can just send messages out via network stack.

VMHM 1030 can track VM inventory, including both those VMs that are loaded and running, as well as those machines that are locally available but not currently running. VMHM 1030 will use a combination of local file access and received network communication to identify VMs. To locate applications capable of running VMs, VMHM 1030 can inspect the well understood process table within Linux to identify known VM running applications (including, for example, VMWare Player, VMWare Server, VMWare ESX, VMWare Workstation, Xen, etc.)

IM 1022 can also provide some level of information on installed packages that can be used to locate installed applications that are known to be capable of running virtual machines. To locate and identify currently running local guest virtual machines, VMHM 1030 can process network communications intercepted by PFM 1038 and examine packets sent from separate VMHM instances that have been sent down the network stack. VMHM 1030 can also send messages down the network stack so that if the associated VMHM is running within a guest VM itself, then the host containing VMHM may intercept the message to determine that there is a currently running VM containing an installed virtualization engine.

At startup, VMHM 1030 can send out information to AC 1014 (via CM 1018) indicating the running status and requesting authorization to proceed with enabling network communications. VMHM 1030 can wait and then process any response from AC 1014. If AC 1014 sends a response authorizing VMHM 1030 to proceed, then VMHM 1030 will send (via CM 1018) a message to KIF 1046 indicating that all network communications can be enabled.

Figure 11:
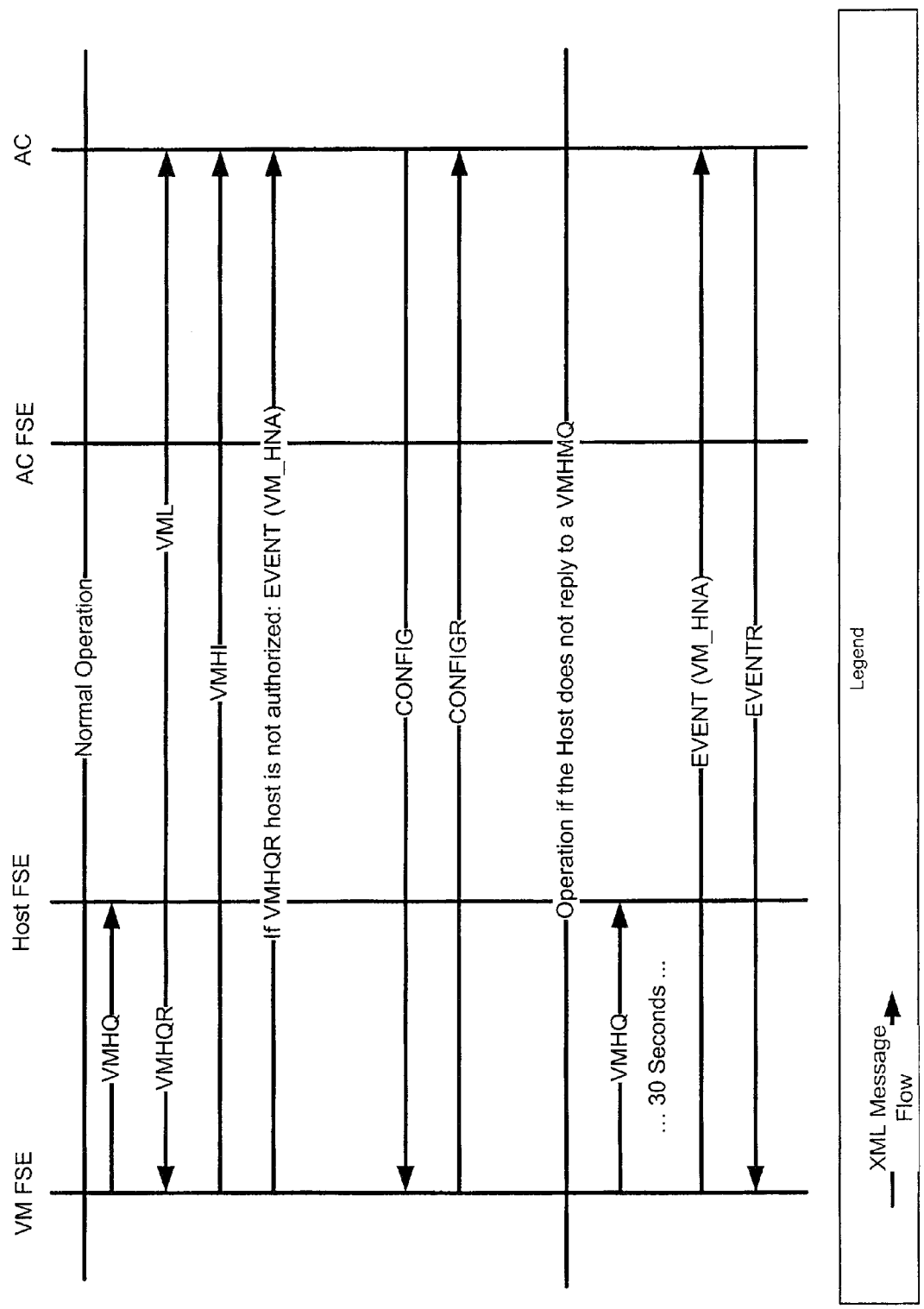
FIG. 11 illustrates an example of a communications protocol that can be used for a messaging channel.

FIG. 11 depicts a protocol that could be used to establish a messaging channel (or VM channel) between VMHMs that can reside in a host machine and a VM. The VMHM can use the protocol shown in FIG. 11 to perform the following functions:

1. Monitor for VM Host Query (VMHQ) messages received from the protocol direction, and reply with a VMHQ response (VMHQR) with information about the current host.
2. When a VMHQ message is received, send a VM List (VML) message to the AC detailing the VMs that are running on the corresponding host.
3. Send a VMHQ message and monitor for a VMHQR to determine if the VM is running under a host that can respond with its host information.
4. When a VMHQR message is received, send a VM Host Info (VMHI) message to the AC detailing which host this VM is currently running under.
5. Block all network traffic to/from a VM until a valid VMHQR message is received from an authorized Host. Blocking can be accomplished as follows:
   a. A configuration item for the VM will allow the machine to send/receive BOOTP and/or VPN traffic before a valid Host is determined. BOOTP refers to the Bootstrap Protocol, which typically allows a host machine to receive configuration information from a network server.
   b. Remediation for blocking traffic can be sent to NONE, INFO, MANUAL, AUTO.
      i. NONE—traffic will never be blocked, and the AC will not be alerted when this machine is run under a host that is not authorized.
      ii. INFO—traffic will never be blocked, and the AC will be alerted when this machine is run under a host that is not authorized. However, the AC will not set this machine to an "ALERTED" state (which can, for example, be colored RED on the AC).
      iii. MANUAL—traffic will only be blocked if the AC sends a command to block the event.
      iv. AUTO—traffic will automatically be blocked when the node is not running on an authorized host.
6. If a machine has been configured with an authorized Host List, then that machine will send a VM_HNA (VM Host Not Authorized) message to the AC after waiting for a VMHQR for 30 seconds.
7. Send a new VMHQ message when the VM is resumed from a suspended state.

The discussion above has focused on various embodiments that can establish a messaging channel between a virtual machine and a host machine. Once that messaging channel has been established and communications have occurred between (a) the administrative console and the host machines and (b) the administrative console and the virtual machines in the system, a network topology can be generated (where a network topology can be a map of the corresponding network). The network topology can be used to determine characteristics about a particular VM, including, for example, whether the VM is a move, copy, a clone, or a rogue copy.

In the case of a VM move, all files associated with the VM are copied, the MAC address of the VM remains the same, the VM files are copied to a different location (for example, to a different folder on the same host machine or to a different host altogether). A move is detected when the original VM is not running when the copied VM is started.

In the case of a VM copy all files associated with the VM are copied, the MAC address of the VM remains the same, the VM files are copied to a different location (for example, to a different folder on the same host machine or to a different host altogether). A copy is detected when both instances of the VM are online at the same time. A VM copy is also called a VM duplicate.

Unlike the copy described above, a rogue copy is a copy of a VM that is running on a Hypervisor that cannot block the network traffic from the copied virtual machine. A rogue copy can also occur where a copy of a VM is detected on a host machine where the virtualization environment is not installed. The rogue copy of a virtual machine cannot have its network traffic blocked by the host machine, therefore, this machine can corrupt network traffic of the original virtual machine.

A system of communication between host machines, virtual machines, and the administrative console can also be used to determine whether VMs are "in motion" (i.e., situations where the location of the files making up the virtual machine has changed, or situations where two host are accessing the same physical image of a virtual machine).

A system of communication between host machines, virtual machines, and the administrative console can also be used to determine whether VMs are "in motion" (i.e., situations where the location of the files making up the virtual machine has changed). In such a case the MAC address will likely change when it is moved to another machine.

VMs that are created for a hypervisor can easily be moved, duplicated or cloned to run on another hypervisor. When a virtual machine is moved or duplicated the MAC address of the virtual machine remains the same as the parent virtual machine. When a virtual machine is cloned the MAC address of the virtual machine is changed from the parent virtual machine. Two duplicate virtual machines will create network problems if they are running in the same network. Two cloned virtual machines can create problems if they are running the same network services, and these services collide when they are in the same network. Tracking the lineage and migration of a virtual machine has multiple purposes. The ability to determine if a virtual machine ever ran on a specific hypervisor can be used to determine which virtual machines ran on a compromised or corrupted hypervisor. The ability to determine which virtual machines were the parent of a virtual machine, and at what time the lineage split, and can be used to determine which virtual machines have attributes added to the virtual machine lineage at a particular place and time. The system is also capable of enforcing policy to ensure that a new duplicate or cloned machine will not disrupt an existing virtual machine.

Figure 12:
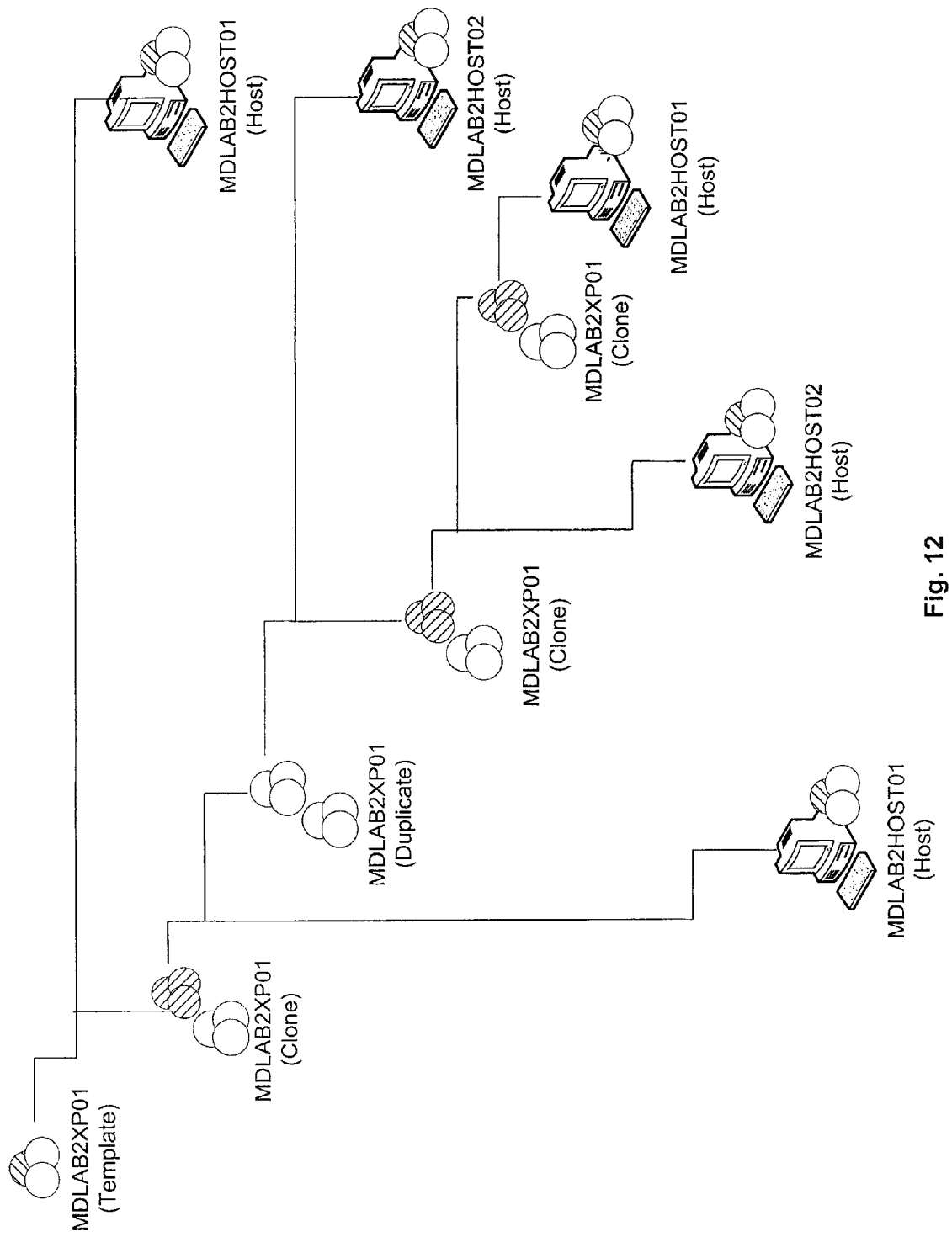
FIG. 12 illustrates an example of a screen shot showing the lineage of various components, based on information derived over the messaging channel.

A screen image of an example of a system that visually depicts the lineage of a selection of virtualization environment components is shown in FIG. 12. A system to implement such tracking can consist of three components already described in detail above: the administrative console, the hypervisor monitor, and the virtual machine monitor. The administrative console can collaborate with hypervisor monitor and virtual machine monitor to detect moves, clones and duplicates, and to track the lineage and migration of these virtual machines. The hypervisor monitor communicates with virtual machines that are running on the hypervisor to receive information required to identify that virtual machine. The hypervisor monitor will communicate with the administrative console and send this information. The virtual machine monitor will also communicate with the administrative console in the event that the hypervisor is not running a monitor.

The virtual machine monitor and the hypervisors will communicate information that will be used to uniquely identify the virtual machines that are running on the hypervisor and will be used to determine if the virtual machine was moved, copied or cloned from another virtual machine. This information will include (but is not limited to); the MAC addresses of the virtual machine, the name of the virtual machine, any unique identifier generated by the hypervisor to track the virtual machine, the location of the virtual machines persistent storage, and a virtual machine unique identifier assigned to each virtual machine by the system.

The administrative console will compare the information received by each hypervisor monitor and virtual machine monitor to determine if the virtual machine is a new virtual machine, a previously discovered virtual machine, a duplicated machine, or a cloned machine. The administrative console will detect a cloned machine by looking at information which changes when a clone is created (for example the MAC address) and comparing that with previously discovered virtual machines which contain the same information in fields that do not change (the virtual machine unique identifier assigned to each virtual machine by the system). The administrative console will detect a moved or duplicate machine by looking at the information and determining if that information was received by a virtual machine running with a different hypervisor or an unidentified hypervisor.

The administrative console will be able to modify the virtual machine unique identifier assigned to each virtual machine by the system to enable the tracking of clones and duplicate virtual machines. By changing this virtual machine unique identifier, and tracking the hypervisor and lineage of each virtual machine unique identifier transition, the administrative console will be able to determine the lineage (which parent the virtual machine was derived from) and the migration (which hypervisors the virtual machine has run under). The lineage and migration tracking is not limited to a single migration or lineage tracking event, but the lineage and migration tracking can track all changes since the implementation of the system.

CONCLUSION

The methods and system described herein allow a virtual machine to be tracked by compiling information about the virtual machines in a network and sending the information about the virtual machines to an administrative console. The administrative console can determine the status of the virtual machines in the network and establish a lineage of a virtual machine, along with the migration of a virtual machine from one host machine to another host machine. A virtual machine unique identifier assigned to each virtual machine by the system can be modified and used to track each virtual machine and associated host machine. A parent virtual machine of each virtual machine can be determined based on the transitions of each virtual machine unique identifier. A timeline can also be established for when the virtual machine was running on those host machines and a status can be determined of the virtual machines, where the status can be a new virtual machine, a previously discovered virtual machine, a duplicated virtual machine, or a cloned virtual machine.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for tracking a virtual machine comprising:
   establishing one or more channels between one or more virtual machines and a host machine, wherein one of the one or more virtual machines has been derived from a parent virtual machine hosted by a different host machine;
   exchanging, at the host machine, messages between the one or more virtual machines and the host machine, the messages identifying a hypervisor to the one or more virtual machines and identifying the one or more virtual machines to the hypervisor, the messages comprising addresses of the one or more virtual machines and identifiers of the one or more virtual machines, wherein an identifier of each of the one or more virtual machines is to remain unchanged upon a change in a migration status of a respective virtual machine;
   compiling, at the host machine, information about the one or more virtual machines in a network, wherein the information about the one or more virtual machines comprises the identifiers of the one or more virtual machines and the addresses of the one or more virtual machines included in the messages, wherein an identifier of a derived virtual machine is associated with an identifier of the parent virtual machine; and
   sending the information about the one or more virtual machines to an administrative console, the information about the one or more virtual machines being indicative of a migration status of the derived virtual machine and other virtual machines of the one or more virtual machines.

2. The method of claim 1, wherein the sending is performed by a host machine.

3. The method of claim 2, wherein the host machine is the hypervisor.

4. The method of claim 1, wherein the sending is performed by a virtual machine.

5. The method of claim 1, further comprising determining the migration status by establishing a lineage of a virtual machine of the one or more virtual machines and the migration of the virtual machine from one host machine to another host machine.

6. The method of claim 5, further comprising:
   modifying the identifier assigned to each virtual machine by the system;
   tracking each virtual machine identifier transition and associated host machine about a host machine on which each virtual machine is running;
   determining a parent virtual machine of each virtual machine based on the transitions of each virtual machine identifier;
   determining one or more host machines on which each virtual machine has run; and
   establishing a timeline for when the each virtual machine was running on those host machines.

7. The method of claim 5, further comprising displaying the lineage of the virtual machine.

8. The method of claim 1, further comprising determining the migration status by:
   comparing information that will not change on a cloned virtual machine and information that will change on the cloned virtual machine to information about the one or more virtual machines; and
   determining if a virtual machine of the one or more virtual machines is the cloned virtual machine based on the comparison.

9. The method of claim 8 wherein the information about the one or more virtual machines comprises one or more of a media access control (MAC) address of the virtual machine, a name of the virtual machine, an identifier generated by the hypervisor to track the virtual machine, a location of the persistent storage of the virtual machine, or an identifier assigned to the virtual machine by the administrative console.

10. The method of claim 1, further comprising determining the migration status by:
    comparing information that will not change on a duplicated virtual machine and information that will change on the duplicated virtual machine to information about the one or more virtual machines; and
    determining if a virtual machine of the one or more virtual machines is the duplicated virtual machine based on the comparison.

11. The method of claim 10 wherein the information about the one or more virtual machines comprises one or more of a media access control (MAC) address, the devices in the virtual machine, a name of the virtual machine, an identifier generated by the hypervisor to track the virtual machine, a location of the persistent storage of the virtual machine, or an identifier assigned to the virtual machine by the administrative console.

12. The method of claim 1, further comprising determining the migration status by:
    comparing information that will not change on a moved virtual machine and information that will change on a moved virtual machine to information about the one or more virtual machines; and
    determining if a virtual machine of the one or more virtual machines is the moved virtual machine based on the comparison.

13. The method of claim 12 wherein the information about the one or more virtual machines comprises one or more of a media access control (MAC) address of the virtual machine, a name of the virtual machine, an identifier generated by the hypervisor to track the virtual machine, a location of the persistent storage of the virtual machine, or an identifier assigned to the virtual machine by the administrative console.

14. The method of claim 1, wherein the status further comprises at least one of a new virtual machine, a previously discovered virtual machine, a duplicated virtual machine, or a cloned virtual machine.

15. A method for preventing a virtual machine from operating, the method comprising:
    determining an identifier and an address of a virtual machine being evaluated, and an identifier of a first hypervisor associated with the virtual machine being evaluated;
    determining whether the virtual machine being evaluated is a duplicate or clone of an existing virtual machine using the identifier of the first hypervisor, the identifier and address of the virtual machine being evaluated, an identifier of a second hypervisor associated with the existing virtual machine, and an identifier and address of the existing virtual machine; and
    if the virtual machine being evaluated is the duplicate or clone virtual machine, instructing a host machine having the first hypervisor on which the duplicate or clone virtual machine is running to prevent activity by the duplicate or clone virtual machine.

16. The method of claim 15 wherein the preventing activity further comprises blocking any communications by the duplicate or clone virtual machine sent to the network.

17. The method of claim 15 wherein the preventing activity further comprises powering down the duplicate or clone virtual machine.

18. The method of claim 15 wherein the preventing activity further comprises instructing a virtual machine monitor to stop any communications by the duplicate or clone virtual machine sent to the network.

19. A system:
a memory; and
a processing device, coupled to the memory, to:
establish one or more channels between one or more virtual machines and a host machine, wherein one of the one or more virtual machines has been derived from a parent virtual machine hosted by a different host machine;
exchange messages between the one or more virtual machines and the host machine, the messages identifying a hypervisor to the one or more virtual machines and identifying the one or more virtual machines to the hypervisor, the messages comprising addresses of the one or more virtual machines and identifiers of the one or more virtual machines, wherein an identifier of each of the one or more virtual machines is to remain unchanged upon a change in a migration status of a respective virtual machine;
compile information about the one or more virtual machines in a network, wherein the information about the one or more virtual machines comprises the identifiers of the one or more virtual machines and the addresses of the one or more virtual machines included in the messages, wherein an identifier of a derived virtual machine is associated with an identifier of the parent virtual machine; and
send the information about the one or more virtual machines to an administrative console, the information about the derived virtual machine and other virtual machines of the one or more virtual machines being indicative of a migration status of the one or more virtual machines.

20. A non-transitory computer readable storage medium including instructions that, when executed by a processor device, cause the processing device to perform a method comprising:
establishing one or more channels between one or more virtual machines and a host machine, wherein one of the one or more virtual machines has been derived from a parent virtual machine hosted by a different host machine;
exchanging messages between the one or more virtual machines and the host machine, the messages identifying a hypervisor to the one or more virtual machines and identifying the one or more virtual machines to the hypervisor, the messages comprising addresses of the one or more virtual machines and identifiers of the one or more virtual machines, wherein an identifier of each of the one or more virtual machines is to remain unchanged upon a change in a migration status of a respective virtual machine;
compiling information about the one or more virtual machines in a network, wherein the information about the one or more virtual machines comprises the identifiers of the one or more virtual machines and the addresses of the one or more virtual machines included in the messages, wherein an identifier of a derived virtual machine is associated with an identifier of the parent virtual machine; and
sending the information about the one or more virtual machines to an administrative console, the information about the one or more virtual machines being indicative of a migration status of the derived virtual machine and other virtual machines of the one or more virtual machines.

* * * * *